United States Patent [19]
Brubaker et al.

[11] Patent Number: 5,470,590
[45] Date of Patent: Nov. 28, 1995

[54] REUSABLE DIE SHAPE FOR THE MANUFACTURE OF MOLDED CUSHIONS

[75] Inventors: Clifford E. Brubaker, Pittsburgh; David M. Brienza, Allison Park, both of Pa.; Michael J. Brienza, Easton, Conn.

[73] Assignee: University of Pittsburgh, Pittsburgh, Pa.

[21] Appl. No.: 189,490

[22] Filed: Jan. 31, 1994

[51] Int. Cl.⁶ .................................................. B28B 7/02
[52] U.S. Cl. ............................ 425/2; 425/3; 425/163; 425/DIG.33; 249/55; 249/155; 264/222
[58] Field of Search ................................ 425/162, 163, 425/2, 3, DIG. 33, DIG. 30; 264/222; 249/55, 155

[56] References Cited

U.S. PATENT DOCUMENTS

| | | | |
|---|---|---|---|
| 2,410,888 | 11/1946 | Lucy | 249/155 |
| 2,523,525 | 9/1950 | Sachs | 154/1 |
| 3,722,257 | 3/1973 | Bogart et al. | 425/DIG. 30 |
| 4,252,514 | 2/1981 | Gates | 425/162 |
| 4,367,897 | 1/1983 | Cousins | 297/284 |
| 4,390,491 | 6/1983 | Woodall | 264/219 |
| 4,484,778 | 11/1984 | Cousins et al. | 297/284 |
| 4,615,856 | 10/1986 | Silverman | 264/222 |
| 4,753,482 | 6/1988 | Warren | 297/458 |
| 4,763,951 | 8/1988 | Silverman | 297/354 |
| 4,828,325 | 5/1989 | Brooks | 297/458 |
| 4,852,945 | 8/1989 | Rowles et al. | 297/458 |
| 4,890,235 | 12/1989 | Reger et al. | 364/468 |
| 4,932,852 | 6/1990 | Suzuki | 425/2 |
| 4,951,336 | 8/1990 | Silverman | 5/481 |
| 4,972,351 | 11/1990 | Reger et al. | 364/468 |
| 4,998,354 | 3/1991 | Silverman et al. | 33/514.2 |
| 5,035,467 | 7/1991 | Axelson et al. | 297/440 |
| 5,052,647 | 10/1991 | Axelson et al. | 248/231 |
| 5,060,393 | 10/1991 | Silverman et al. | 33/512 |
| 5,074,507 | 12/1991 | Axelson et al. | 248/305 |
| 5,102,195 | 4/1992 | Axelson et al. | 297/440 |
| 5,151,277 | 9/1992 | Bernardon et al. | 249/155 |
| 5,193,285 | 3/1993 | Heinrich et al. | 33/514.2 |
| 5,281,117 | 1/1994 | Hong | 249/155 |
| 5,387,384 | 2/1995 | Irving | 249/155 |

FOREIGN PATENT DOCUMENTS 8707233  12/1987  WIPO .................................. 425/162

OTHER PUBLICATIONS

"Seat Support Surface Optimization Using Force Feedback", David M. Brienza et al., IEEE Transactions On Biomedical Engineering, vol. 4, No. 1, Jan. 1993, pp. 95–104.

"A Manufacturing System For Contoured Foam Cushions", David M. Brienza et al., Journal of Rehabilitation Research and Development, vol. 29, No. 4, 1992, pp. 32–40.

Pin Dot Products advertisement entitled "Add Up The Advantages, And You'll Choose Silhouette", 4 pp. (1991).

*Primary Examiner*—Allan R. Kuhns
*Attorney, Agent, or Firm*—Webb Ziesenheim Bruening Logsdon Orkin & Hanson

[57] ABSTRACT

A reusable die for the manufacture of molded seat cushions that includes a first device for forming a positive profile of a contoured surface, such as a seating support surface, from data obtained for defining the positive surface profile; and a second device for forming a negative profile of the contoured surface, whereby the first surface is adapted to be maintained in contact with the second surface. The first device includes a plurality of rods adapted to define the positive profile. The second device also includes a plurality of rods and a deformable member, such as a wire mesh, that coact with the rods of the first device to form the negative profile. The rods of both the first device and the second device are adapted to be locked in place. A sealing surface is vacuum formed over the negative profile, which then forms a wall of a foam mold. Liquid foam material is then injected in the mold and permitted to cure thereby forming a contoured seat cushion. Also disclosed is a method to manufacture a contoured seat cushion.

37 Claims, 8 Drawing Sheets

REUSABLE DIE SHAPE FOR THE MANUFACTURE OF MOLDED CUSHIONS

BACKGROUND OF THE INVENTION

1. Field of the Invention

This invention relates generally to the manufacture of seat cushions, and more particularly to seat cushions for use in wheelchairs.

2. Description of the Prior Art

Recent advances in the rehabilitation technology have improved products available which cushion and support a person while seated. Maintaining a functional seated posture for a long period of time requires special support to prevent pressure sores, which are more commonly known as bed sores. Pressure sores arise from bony protuberances which cause areas of excessive pressure restricting blood flow to the surrounding tissue. Appropriate body support is required to provide protection from pressure sores and to prevent poor circulation and enhance functional capabilities of those restricted to the seated position.

Custom-made contoured cushions have been recognized as providing the support and comfort necessary for those who remain seated for extended periods. Various approaches have been undertaken to fabricate contoured seating cushions which provide the desired support and comfort. Primarily, the advancement in the art in the design and manufacture of customized cushions has been in the manner of measuring a patient's contour for a custom-made cushion, such as the devices and methods disclosed in U.S. Pat. No. 4,890,235 to Reger et al.; U.S. Pat. No. 4,972,351 to Reger et al.; U.S. Pat. No. 4,998,354 to Silverman et al.; and U.S. Pat. No. 5,193,285 to Heinrich et al.

Generally speaking, seat contour data is obtained by the patient sitting on a mechanical or an electro/mechanical profile measuring device. Then the data is converted into a seat profile. One such computer program that converts the raw data into a seat cushion profile is Seat Maker™ software developed by Pin Dot Products. The converted data can then be sent to a numerically controlled computer aided milling machine, which in turn machines a foam custom fit cushion from the input data. This is a very expensive process and very time-consuming. Furthermore, there is a substantial amount of waste in the foam cushion.

Another method for manufacturing custom contoured seat cushions is disclosed in U.S. Pat. No. 4,763,951 to Silverman, where a cushion profile is made by a patient sitting on a "bean bag" type seat. A vacuum is drawn on the seat making an impression of a contoured seating cushion. Subsequently, plaster impregnated gauze strips are laid over the impression forming mold. This mold is then sent to a fabricator which then uses that mold to make a foam seat cushioned by pouring a foamable material into the plaster impression and then removing the impression. This method is extremely labor intensive, and in turn results in an expensive seat cushion.

Yet another method for manufacturing a custom contoured seat cushion is set forth in U.S. Pat. No. 4,828,325 to Brooks. This patent discloses a method upon which a patient is placed upon a molding device having a deformable upper surface defining a molding cavity. Then a foamable material is injected into the molding cavity to form a foam custom contoured seat cushion. One problem with the device as disclosed in the Brooks patent is that various computer techniques, such as that of the Seat Maker™ software program, are not available to customize the cushion.

Accordingly, it is an object of the invention to economically and quickly manufacture custom seat cushions.

The object is achieved through many unique features of the present invention, such as the use of a device to form a positive profile, a device to form a negative profile, utilizing a plurality of rods to define the profile, the use of gravitational forces to assist in the formation of the positive profile, and the use of a computer to determine the positive profile shape and to control the device to form a positive profile.

SUMMARY OF THE INVENTION

The invention is an apparatus for forming a contoured article, such as a seating cushion, having a first device for forming a positive surface profile of a contoured surface, such as a seating support surface, from data obtained for defining the positive surface profile and a second device for forming a negative surface profile of the contoured surface, such as a seating support surface, whereby the first device is adapted to be maintained in contact with the second device.

The first device includes a plurality of rods extending in a first longitudinal direction. Each of the rods has a first end and a second end. A frame is provided having a base and a rod guide plate attached to the base. The rod guide plate has a plurality of rod guide holes whereby each rod guide hole slidably receives a respective rod. A motor is provided and is adapted to move a drive plate in the longitudinal direction. The drive plate contacts the second ends of the rods.

A locking arrangement is provided for the first device to hold the rods in place. The locking arrangement includes a magnetic arrangement that includes a plurality of magnetic members. Each magnetic member is adapted to be positioned in close proximity to one of the respective rods made of magnetic material. Each of the magnetic members is adapted to be activated to magnetically attract the respective rod and prevent the rod from moving in the first longitudinal direction.

The locking means also includes a mechanical locking member comprised of a fixed plate having a plurality of holes. Each hole receives a respective rod. A moving plate is provided having a plurality of holes whereby each of those holes receives a respective rod. A device for moving the plate in a second longitudinal direction is provided that is adapted to bind the rods and prevent the rods from moving in the first longitudinal direction. A cam can be provided to cause the moving plate to move in the second longitudinal direction whereby the cam is adapted to abut against a leg of the frame in a first position thereby binding the rods to prevent the rods from moving in a first longitudinal direction.

The second device includes a plurality of rods extending in the first longitudinal direction. Each of the rods includes a first end and a second end. A deformable member contacts the first end. A device for moving the first ends of the rods and the deformable member in the longitudinal direction is provided. A frame is provided having a base and a rod guide plate attached to the base. The rod guide plate includes a plurality of rod guide holes similar to that of the first device. Each rod guide hole slidably receives a respective rod. A plurality of springs attach to the rods and the rod guide plate and coact with the plate and urge the rods in a first position. Each of the rods' first ends has a slot that is adapted to receive the deformable member, which is made of a plurality of deformable strands made of a deformable material, such as metal. The strands are attached to the frame through a spool that is adapted to receive the strands. A locking device similar to the mechanical locking device used in the first device is provided to lock the rods in place.

Furthermore, the invention includes a device for obtaining data for positive surface profile and a device for forming a seat cushion from the negative surface profile and includes means for forming a cushion out of a foam material.

The invention also includes a method for forming a contoured seating support cushion including the steps of defining a positive surface profile of the seating support surface; forming a positive surface profile of the seating support surface; forming a negative surface profile of the seating support surface; forming a sealing surface of the negative surface profile; placing the sealing surface in a foam mold; the sealing surface defining an upper surface of the foam mold; and injecting a foamable material into the mold and forming a contoured seat cushion having a contoured surface defined by the sealing surface. The sealing surface can be formed by vacuum forming techniques.

DESCRIPTION OF THE PREFERRED EMBODIMENTS

Figure 1:
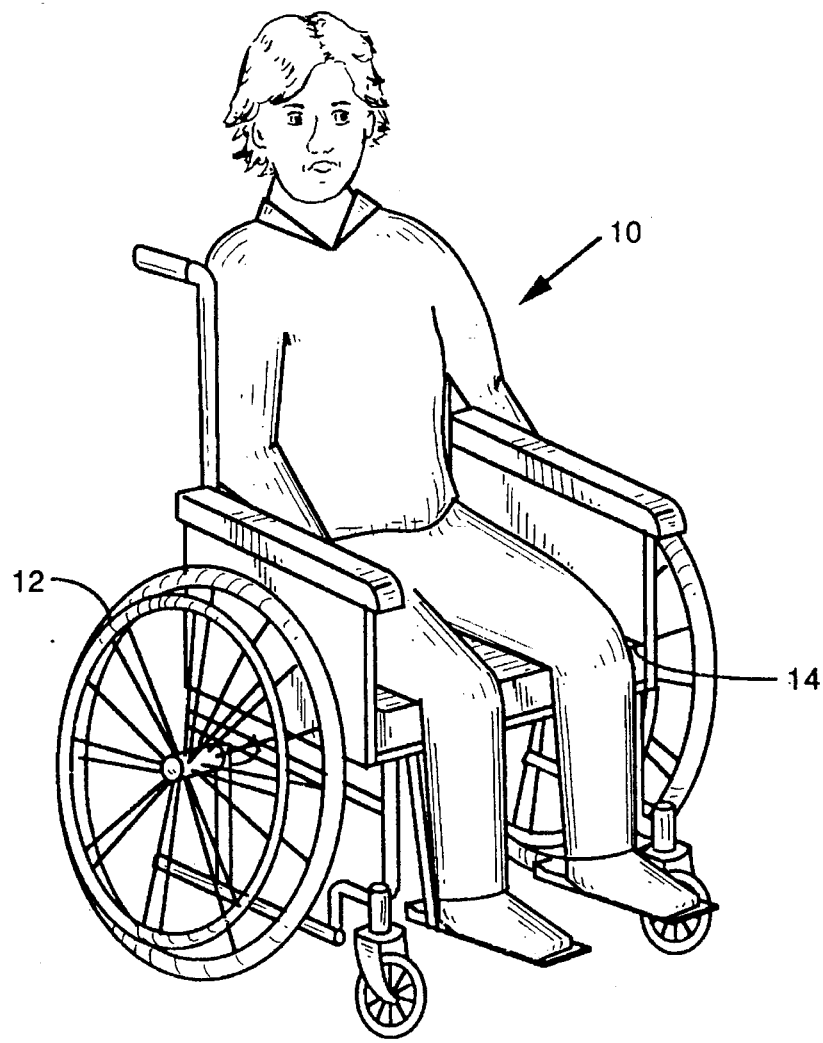
FIG. 1 is a top perspective view of a person in a wheelchair sitting on a prior art seat cushion.
Figure 2:
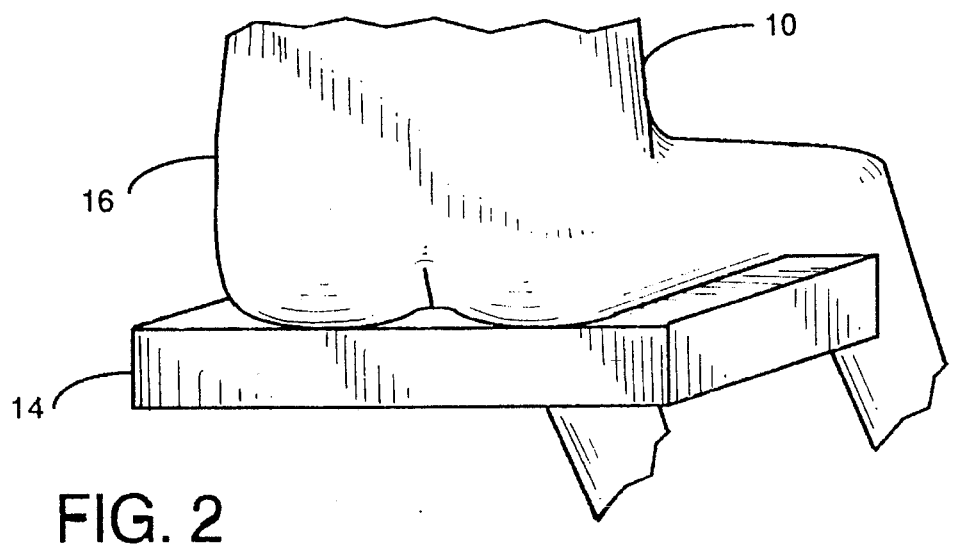
FIG. 2 is a rear view of a person sitting on a prior art cushion.

FIG. 1 shows a person 10 in a standard wheelchair 12 having a substantially rectangular prior art seat cushion 14. As more clearly shown in FIG. 2, the cushion 14 is substantially flat and does not conform to the contour of the person's buttocks 16. This arrangement can result in pressure sores or ulcerations of the buttocks due to improper circulation.

Figure 3:
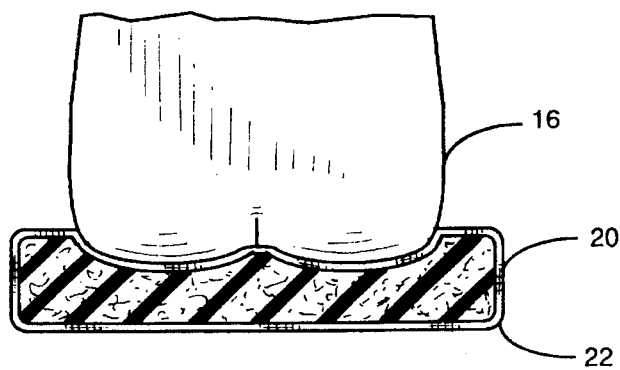
FIG. 3 is a rear view of a person sitting on a contoured cushion made in accordance with the present invention.

FIG. 3 shows a cross sectional view of the buttocks 16 on a contoured foam cushion 20 having a cover 22. As can be seen, the cushion conforms to the shape of the buttocks 16 and reduces the possibility of pressure sores or ulcerations of the buttocks 16.

Figure 4:
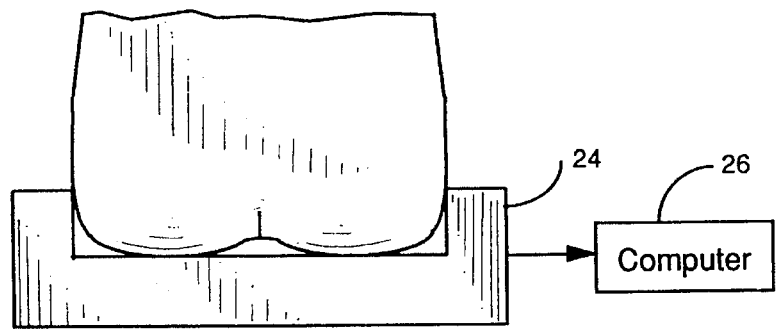
FIG. 4 is a back view of a person sitting on a device to measure the contour of the buttocks.

FIG. 4 shows generally one arrangement to measure the contour of the buttocks for obtaining a custom-made contoured foam cushion 20. Specifically, the person 10 sits on a measuring device 24, such as that disclosed in U.S. Pat. No. 5,193,285, which is hereby incorporated by reference, and a profile is obtained through the activation or displacement of mechanical sensors. This information is then supplied to a computer 26. This information can then be manipulated to identify a profile for a properly fitted seat cushion via the Seat Maker™ software.

Figure 5:
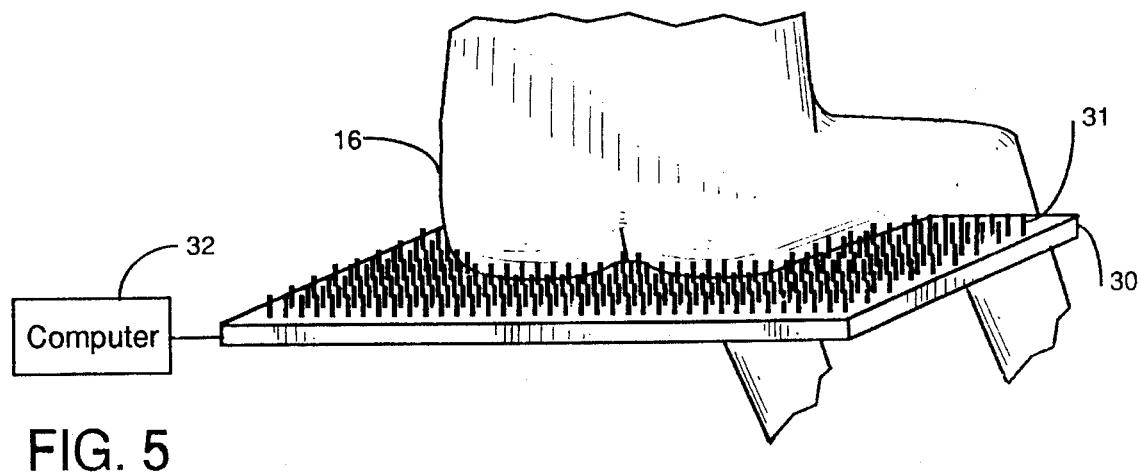
FIG. 5 is a top perspective view of another device to measure the contour of the buttocks.

FIG. 5 discloses another type of measuring device 30, similar to that disclosed in U.S. Pat. No. 4,890,235, which is hereby incorporated by reference. Specifically, the person 10 sits on the measuring device 30 and a profile is obtained through the activation of transducers 31 and a computer 32.

FIGS. 6–13 show a reusable die 40 for the manufacture of molded cushions made in accordance with the present invention. The reusable die 40 utilizes the computer aided profiles previously discussed. The reusable die includes an apparatus for forming a positive surface 50 and an apparatus for forming a negative surface 150.

Figure 6:
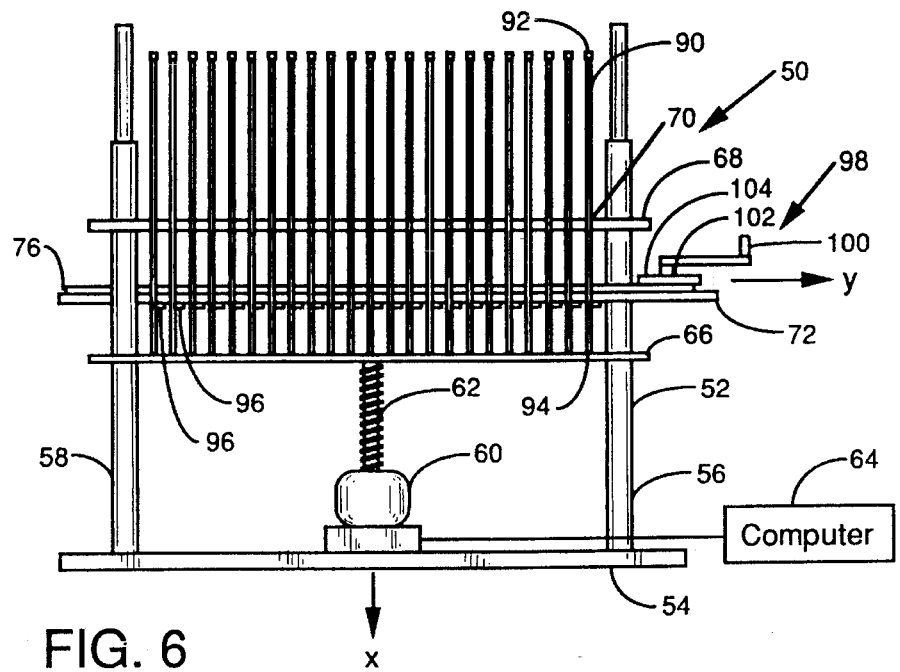
FIG. 6 is a side view of a device for forming a positive surface profile of a seating surface from data defining the positive surface profile made in accordance with the present invention.

FIG. 6 discloses the apparatus for forming a positive surface 50 that includes a frame 52. The frame 52 includes a base 54 and leg members 56 and 58 secured thereto. A stepper motor 60 attaches to the base 54. A shaft 62 extends from the stepper motor 60 and attaches to a drive plate 66. The stepper motor 60 is controlled by a computer 64 and is adapted to drive the shaft 62 in a longitudinal x direction.

Figure 7:
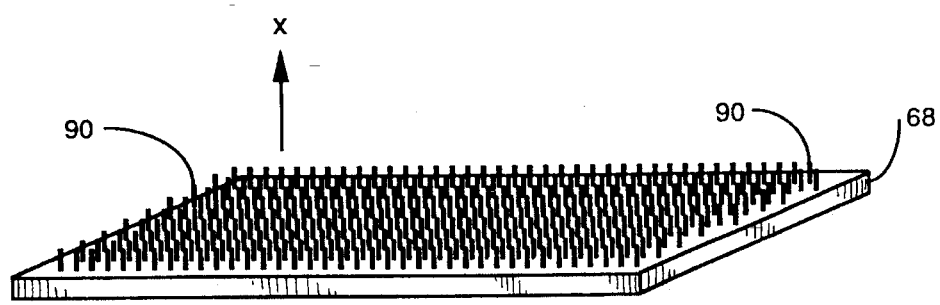
FIG. 7 is a top perspective view of a portion of the device shown in FIG. 6.

As shown in FIGS. 6–8, a rod guide plate 68 attaches to the respective leg members 56 and 58. The rod guide plate 68 is positioned above the drive plate 66 and includes a plurality of rod receiving holes 70.

Figures 8A, 9:
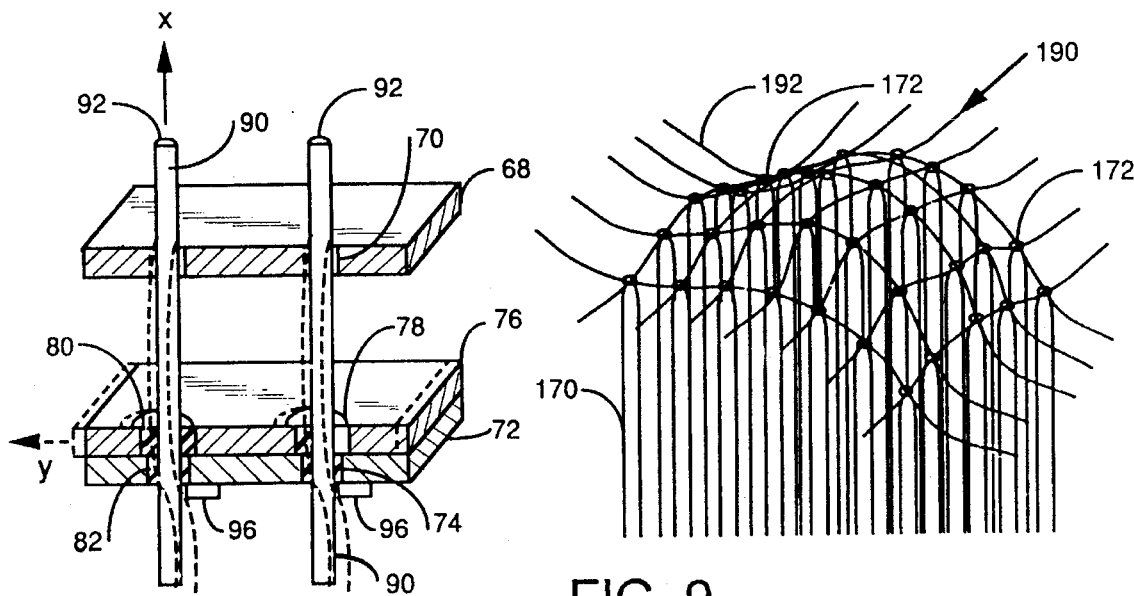
FIG. 8a is a partial side view of the device shown in FIG. 7.
FIG. 9 shows a portion of a second device for forming a negative profile of the seating surface.

A fixed plate 72 attaches to legs 56 and 58. The fixed plate 72 is positioned intermediate the drive plate 66 and the rod guide plate 68. As shown in FIG. 8a, the fixed plate 72 includes a plurality of holes 74 that are substantially the same size and coaxial with the holes 70 of rod guide plate 68. A moving plate 76 rests on fixed plate 72. The moving plate includes a plurality of holes 78 that are coaxial with holes 70 of rod guide plate 68 and holes 74 of fixed plate 72. Annular shaped rubber sleeves 80 are received in holes 78 and annular shaped rubber sleeves 82 are received in holes 74 of fixed plate 72.

A plurality of elongated cylindrical rods 90 pass through fixed plate holes 74 and moving plate holes 78, as shown in FIGS. 7 and 8. The rods 90 are arranged in a plurality of rows and columns, as shown in FIG. 7, and are preferably made of a magnetically attractive material, such as iron. The rods 90 include a substantially flat first end 92 and a second end 94 adapted to rest on an upper surface of the drive plate 66. Rods 90 are slidably received by the rod guide plate 68, fixed plate 72 and moving plate 76 so that they may freely move in the longitudinal x direction when holes 70, 74 and 78 are coaxially aligned.

Figure 8B:
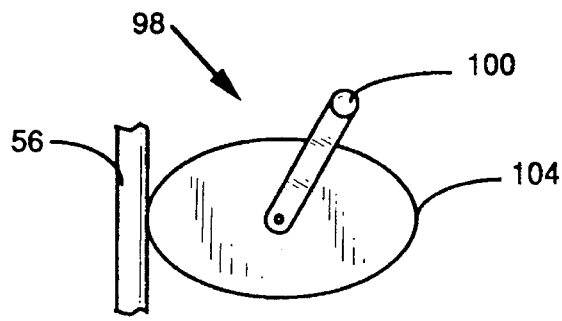
FIG. 8b shows a cam in a first position.
Figure 8C:
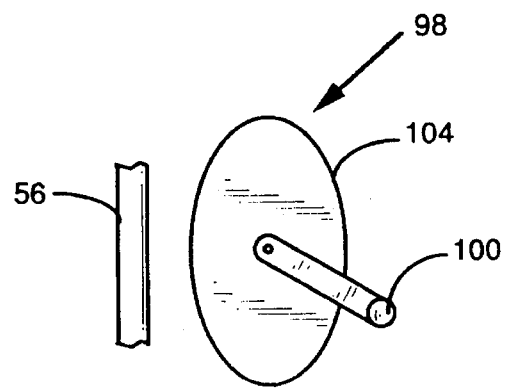
FIG. 8c shows the cam shown in FIG. 8b in a second position.
Figure 8D:
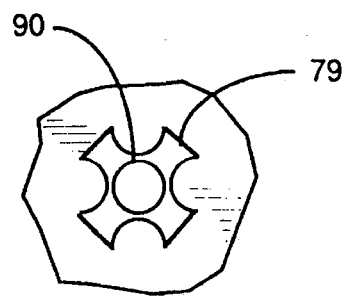
FIG. 8d shows an alternative plate hole arrangement.

A locking arrangement 98 is provided with the apparatus 50 and includes a plurality of electrically activated magnets 96. Each magnet 96 is positioned adjacent to and in close proximity to a respective rod 90 on a lower surface of the fixed plate 72, as shown in FIG. 7. The electronically activated magnets 96 are controlled by and electrically communicated or interfaced with the computer 64. The magnets are activated by a DC power source. Alternatively, magnets could be used which are activated by an AC power source. Such magnets are well known in the art. Locking arrangement 98 also includes a mechanical lock having a crank handle 100 with a shaft 102 depending therefrom and connected to a cam 104, as shown in FIG. 6. The cam 104 pivotally connects to the moving plate 76. When the cam 104 is in a first position, as shown in FIG. 8b, an end surface of the cam abuts against leg member 56 moving the moving plate 76 in a second longitudinal y direction thereby binding the rods 90 against rubber sleeves 80 and 82 (as shown in phantom in FIG. 8). This prevents their movement in the first longitudinal x direction. When the crank is in a second position, as shown in FIG. 8c, the holes 70, 74 and 78 are coaxially aligned so that the rods 90 can slidably move up and down. Holes 70, 74, and 78 can be splined shaped 79, as shown in FIG. 8d. The splined shape is believed to minimize binding of the rods 90 between the respective plates caused by debris becoming lodged in the holes between the rods 90 and the respective plates 68, 72, and 76.

Figure 10A:
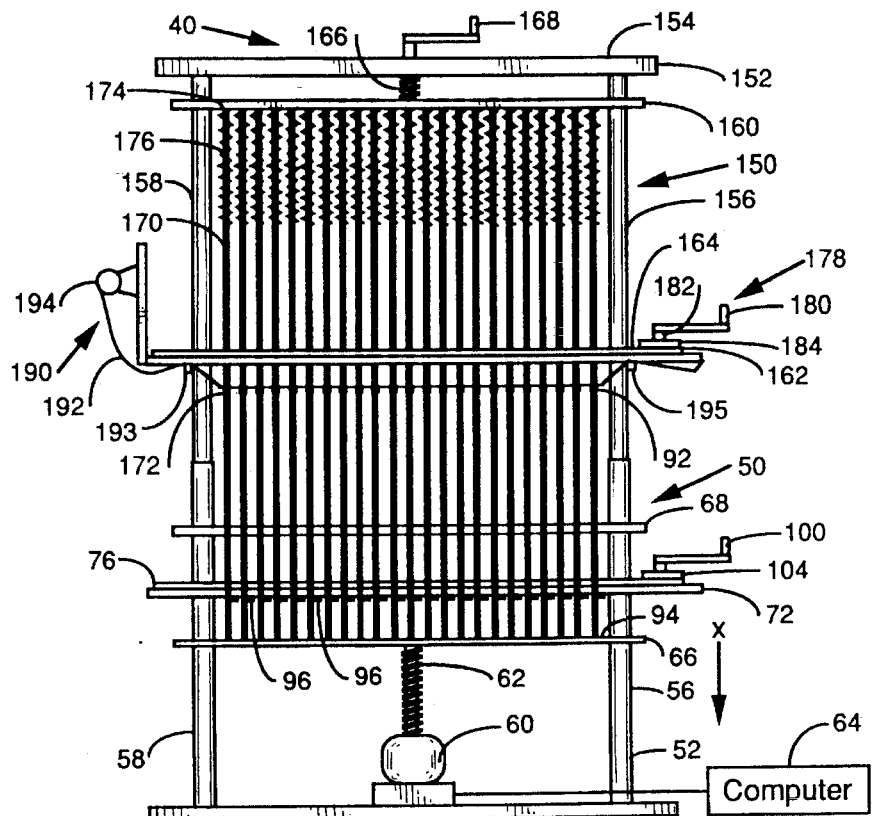
FIG. 10a shows a side view of the first device for forming a positive surface profile of the seating support surface attached to the second device for forming a negative profile of the seating support surface made in accordance with the present invention.
Figure 10B:
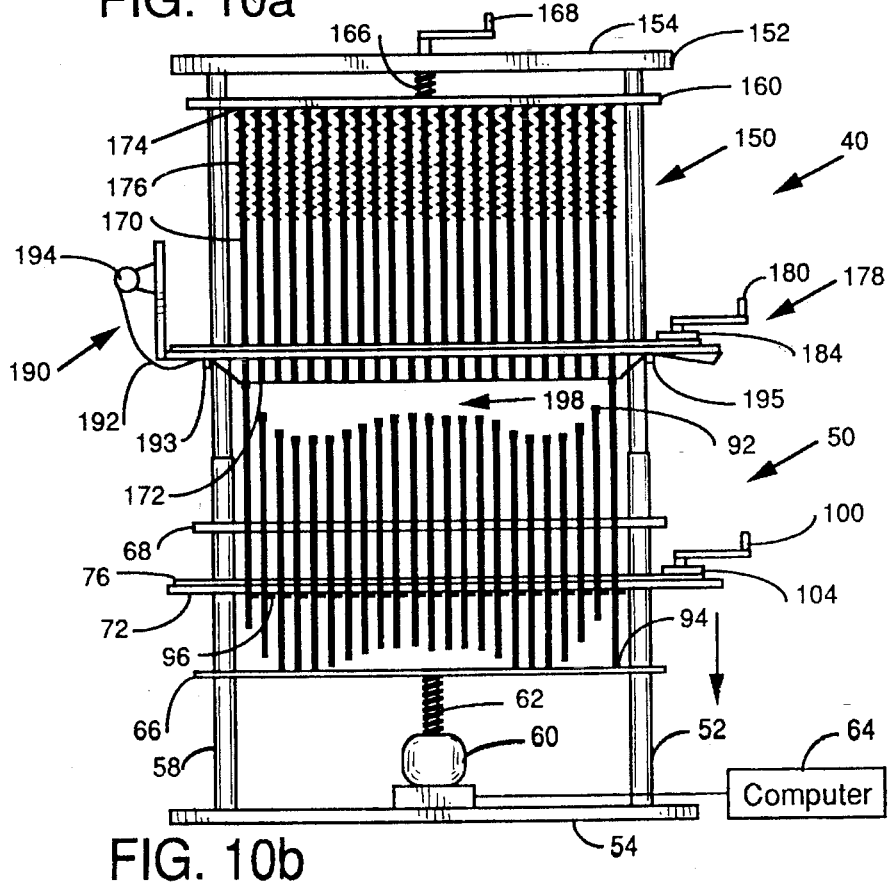
FIG. 10b shows the arrangement of FIG. 10a whereby the first device has formed a positive surface profile.
Figure 10C:
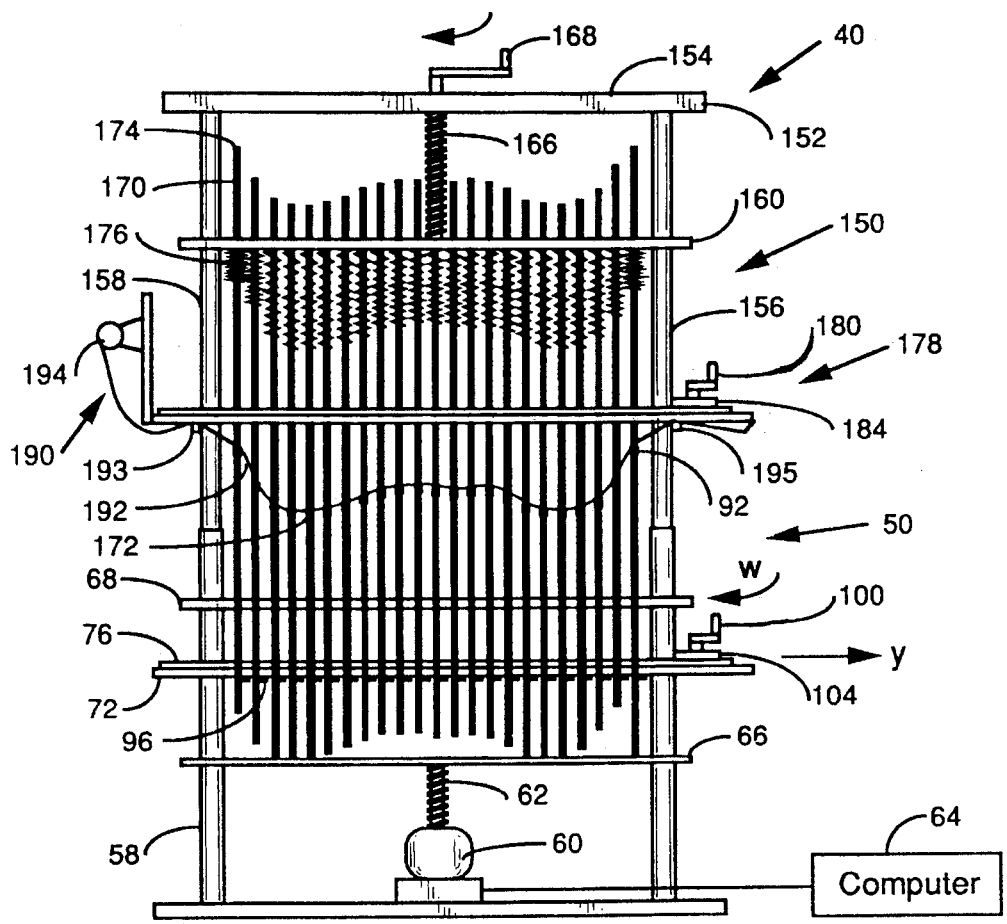
FIG. 10c shows the arrangement shown in FIG. 10a whereby the second device is maintained in contact with the first device forming a negative surface profile.
Figure 10D:
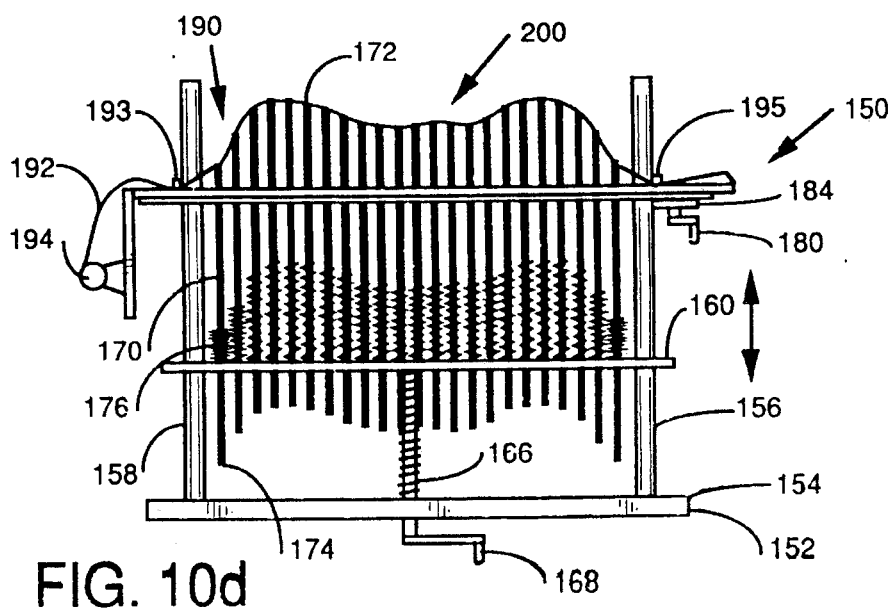
FIG. 10d is a side view of the second device removed from the first device whereby a negative surface profile is defined.

The apparatus for forming a negative surface profile of the seating support surface 150 is shown in FIGS. 9–10d. Specifically as shown in FIG. 10a–10d, apparatus 150 includes a frame 152 having a base 154 and legs 156 and 158. A rod guide plate 160 having a plurality of holes attaches to legs 156 and 158 and is substantially the same as rod guide plate 68. A fixed plate 162 and a moving plate 164 attach to legs 156 and 158. Plates 162 and 164 both have a plurality of holes and rubber sleeves received therein, and are similar to plates 72 and 76, respectively, and therefore will not be discussed in detail.

As shown in FIGS. 10a–10d, a manually operated threaded drive shaft 166 is threadably received by rod guide plate 160. A drive handle 168 attaches to shaft 166. A plurality of rods 170, which each have a slotted first end 172 (as shown in FIG. 9) and a second end 174, pass through respective holes 175 of the rod guide plate 160, fixed plate 162 and moving plate 164. Normally, respective plates 160, 162 and 164 are coaxially arranged so that rods 170 are slidably received by plates 160, 162 and 164. A plurality of annular shaped coil springs 176 is provided. Specifically, each spring 176 has one end attached to plate 160 and another end attached to the respective rod 170, as shown in FIGS. 10a–10d. Rod 170 passes through the annulus defined by the spring 172. Accordingly, in this arrangement, the rods 170 are urged by the springs 176 into a first position, as shown in FIG. 10a.

A mechanical locking arrangement 178 is also provided for the apparatus 150. The mechanical locking arrangement 178 is substantially the same as the mechanical portion of locking arrangement 98 and includes a crank handle 180, shaft 182 and cam 184, which operates substantially as the cam 104.

The apparatus 150 further includes a deformable arrangement 190 including a plurality of deformable malleable metallic strands or wire 192 adapted to pass through slotted first ends 172 of rods 170 forming a wire mesh, as shown in FIG. 9. This arrangement is similar to a thread passing through an eye of a sewing needle. The strands 192 pass through guide bar 193 are then received by a spool 194 rotatably secured to the fixed plate 162. Ends of the strands are held in place by a locking bar 195.

In operation, the legs 156 and 158 of apparatus 150 are abutted against legs 56 and 58 of apparatus 50, as shown in FIG. 10a. The base 54 of apparatus 50 rests on the ground so that all of the rods 90 rest on drive plate 66. Rods 90 are aligned in the longitudinal x direction with respective rods 170. Next the motor 60 is activated by computer 64 causing the plate 66 to move in a downward direction. The rods 90 slide between the respective plates 68, 72 and 76 by gravitational force. Once the height of respective rod 90 is reached relative to base 54, the respective magnetic member 96 adjacent thereto is activated, thereby magnetically holding or locking the rod 90 in place in a specific position and preventing the particular rod 90 from moving in the longitudinal x direction. (The height is determined by the number of "steps" taken by the motor 60.) The remainder of the rods continue to move in the downwardly longitudinal x direction until all of the rods 90 are spacially fixed by activating their respective magnetic member 84, as shown in FIG. 10b. The first ends 92 of rods 90 define a positive profile 198 of the proposed custom contoured seat cushion.

It is important to note that the present invention does not necessarily require the stepper motor 60. Alternatively, any type of motor, hand crank arrangement or manually sliding arrangement can be used to drive plate 66. In that case, a transducer, which is interfaced to the computer 64, can be used to determine the height. One such transducer, a variable electrical resistance type potentiometer, which is well known in the art, could be coupled to the shaft 62. The electrical resistance value can be correlated to the number of rotations of the shaft 62 or the height of the plate 66 from a fixed point such as the base 52, which in turn corresponds to the height of the rods 90.

The rods 90 are then locked in place by the locking arrangement 98. Specifically, cam 104 is locked in a first position causing plate 76 to move toward leg 56. This causes rods 90 to bind between plates 68, 74 and 76, thereby locking rods 90 in place. Any other type of locking arrangement can also be used as long as the rods are held in place. The magnetically activated magnetic members 84 are then deactivated.

Also, it is believed that a plurality of drive plates could be used to support individual columns of rods 90 in lieu of the drive plate 66. Each plate would be moved in the longitudinal x direction individually either by a motor or by hand as discussed above. In this case, it may be preferable to lock the rods by column by a respective locking arrangement.

Next the crank handle 168 is rotated in a clockwise direction forcing the rods 170 in a downwardly longitudinal x direction. This in turn causes the strands 192 to likewise be moved in a downwardly direction and causes the spool 194 to unwind. The locking bar 195 prevents the ends of the strands from passing through the holes 175 of the rods 170. Each rod 170 continues to move in a downwardly longitudinal x direction until the first end 172 of each rod 170 abuts the respective first end 92 of rod 90. Continued rotation of the crank handle 180 will cause plate 62 and the other rods to continue to move in a downwardly direction relative to the stopped rod 170 deforming the strands 192. The plate 162 passes through the abutted rods 170 through respective holes in the plate 162. This continues until the first ends 172 of each rod 170 contacts a respective first end 92 of rods 90 forming a negative profile 200, as shown in FIG. 10*c*. The locking arrangement 178 is arranged so that the cam 184 abuts against leg 156 binding rods 170 and locking them in place in the same manner as locking arrangement 98.

Figure 11:
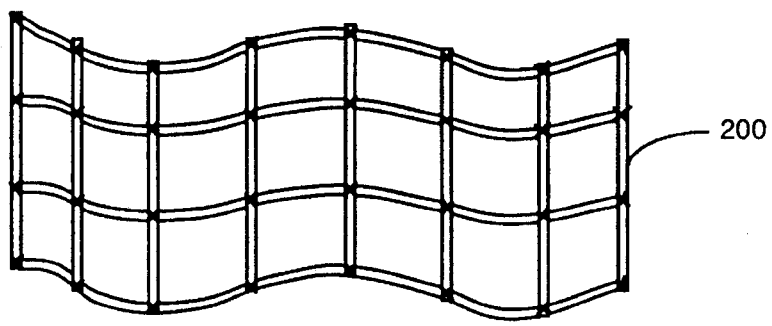
FIG. 11 is a top perspective view of the deformed surface maintained by the second device.
Figure 12:
FIG. 12 is a side view of FIG. 11.
Figure 13:
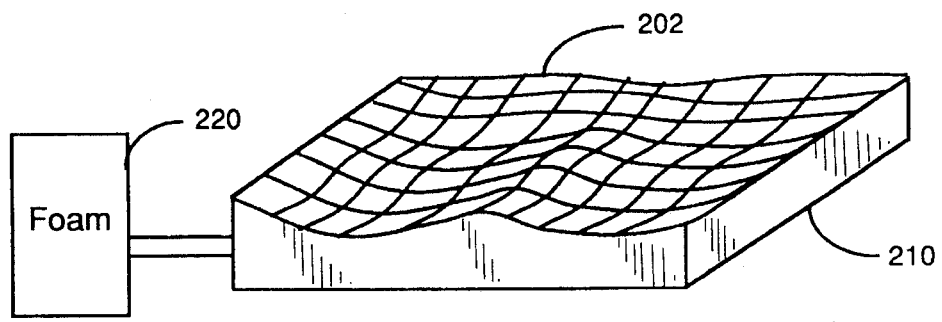
FIG. 13 is a top perspective view of a mold for making a foam seat cushion.
Figure 14:
FIG. 14 is a section of the molded seat cushion made in accordance to the mold shown in FIG. 13.

The apparatus 150 is then removed from apparatus 50 thereby exposing the negative profile 200 formed by the first ends 172 of rods 170 and the deformed strands 192, as shown in FIGS. 10*d*, 11 and 12. A vinyl sheet is then placed on the first ends 172 and strands 92. The sheet is then heated and vacuum molded over the negative profile forming a sealing sheath 202 having a profile similar to the negative profile. The sheath 202 is then removed and forms an upper wall of a substantially square six sided foam mold, as shown in FIG. 13. A liquid foam material 220 is then injected into that mold, which then solidifies and cures, thereby forming a contoured cushion 20 similar to the process that is described in U.S. Pat. No. 4,951,336, which is hereby incorporated by reference. The rods 90 and 170 of apparatuses 50 and 150, respectively, are then moved to their initial position, as shown in FIG. 10*a*, so that another contoured custom-made cushion can be made. Accordingly, apparatus 150 acts as a reusable die.

Figure 15:
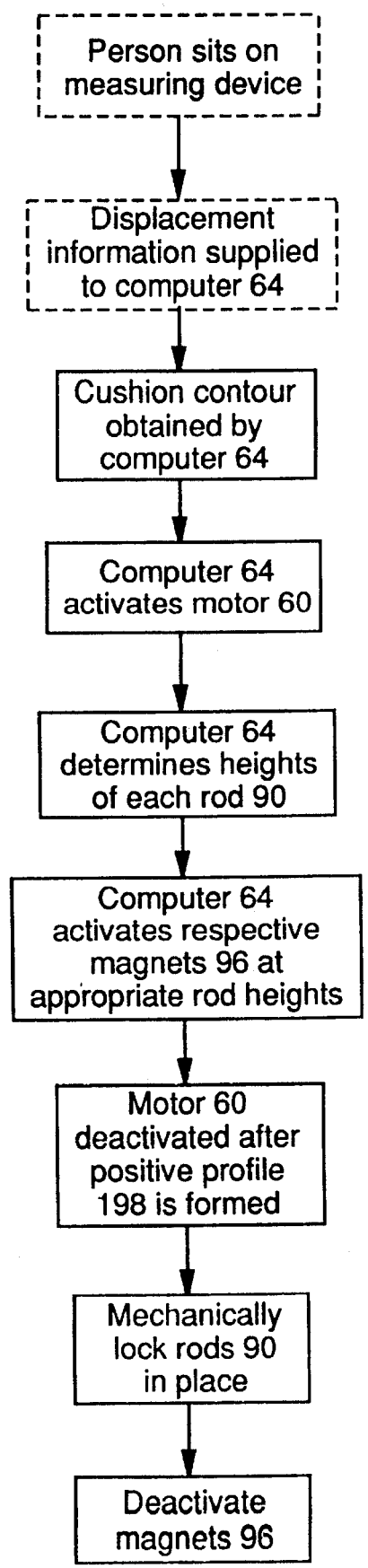
FIG. 15 is a schematic flow diagram of the operation of the present invention.

The presently described invention is substantially less expensive than computer controlled machines for manufacturing custom contoured seat cushions. Furthermore, the computer 64, which can be any type of computer having sufficient memory, is an important feature of the present invention. It is possible that the computer 64 can be used for developing the profile of the cushion, via the Seat Maker™ software for example, and then immediately control motor 60, determine the proper height of rods 90 and activate magnets 96 when the rods are at their proper height. The mechanical locking arrangement 98 could also be activated and controlled by the computer 64, which would then deactivate the magnets. FIG. 15 shows a flow diagram of the above described computer operations. Although all of the operations identified in FIG. 15 can take place at one site, it is possible to have the measurements and contour information obtained at a first site, the positive profile and negative profile formed at a second site and the cushion formed at a third site. Further, the present invention substantially reduces labor costs and the amount of wasted foam. Several apparatuses for making a negative profile 150 can be contained at one site in combination with the apparatus for making a positive profile. This would also reduce the cost for manufacturing a cushion. Furthermore, it is believed that once the positive profile is generated, a contoured cushion could be manufactured on the order of less than one hour, a substantially shorter time than that of the prior art. Also, the presently discussed invention eliminates the need of taking measurements of an individual patient each time the patient needs a new custom contoured seat or maintaining a plaster mold profile of the patient's body area. Such measurements can be maintained on a computer memory or on a floppy disk. Finally, it is believed that the reusable die could be used for manufacturing contoured surfaces other than seat cushions. For example, prototype shrouds or casings could be designed through computer aided design techniques. A positive profile and negative profile could be then formed and then a prototype casing could be vacuum formed over the negative profile.

Having described the presently preferred embodiment of the present invention, it is to be understood that it may be otherwise embodied within the scope of the appended claims.

We claim:

1. An apparatus for forming a contoured article, comprising:

first means for forming a negative surface profile of a contoured surface, said first means including a plurality of first rods;

second means for forming a positive surface profile of the contoured surface, wherein said second means comprises a plurality of second rods, each of said second rods having a first end and a deformable member in contact with each of the first ends, each of said plurality of said first rods adapted to be positioned in contact with an opposed deformable member of said second means forming said positive surface profile of the contoured surface, said plurality of first rods thereby defining said negative surface profile;

locking means located adjacent each of said second rods, said locking means adapted to fix the position of each of said second rods, thereby defining said positive surface profile of the contoured surface; and means for developing contoured surface profile data and establishing said positive surface profile of the contoured surface by activating and deactivating said locking means adapted to fix the position of each of said second rods.

2. An apparatus for forming a contoured article as claimed in claim 1 wherein said plurality of said first rods extends in a first longitudinal direction, each of said first rods having a first end and means for moving said first end of said first rods in the first longitudinal direction.

3. An apparatus for forming a contoured article as claimed in claim 2 wherein said second means further comprises a frame having a base and a rod guide plate attached to said base, said rod guide plate having a plurality of rod guide holes, each rod guide hole slidably receiving a respective second rod.

4. An apparatus for forming a contoured article as claimed in claim 3 wherein each of said second rods includes a second end and said moving means includes a drive plate having an upper surface, said drive plate adapted to move in the first longitudinal direction, said second rod second ends adapted to contact on said drive plate upper surface.

5. An apparatus for forming a contoured article as claimed in claim 4 wherein each of said second rods is made of a magnetic material and said locking means includes a plurality of magnetic members, each magnetic member being adapted to be positioned in close proximity to one of said respective second rods whereby each magnetic member is adapted to be activated to magnetically attract said respective second rod and prevent said second rod from moving in the first longitudinal direction.

6. An apparatus for forming a contoured article as claimed in claim 5 wherein said locking means further comprises a mechanical locking member comprising a fixed plate having a plurality of second holes, wherein each of said second holes receives a respective second rod and a moving plate having a plurality of third holes, whereby each of said third holes receives a respective second rod and means for moving said moving plate in a second longitudinal direction so as to bind said second rods and prevent said second rods from moving in the first longitudinal direction.

7. An apparatus for forming a contoured article as claimed in claim 6 wherein said mechanical locking member includes a cam pivotally attached to said moving plate and said first means frame includes a leg member attached to said base, said rod guide plate and said fixed plate, and said cam being adapted to abut against said leg member in a first position thereby binding said second rods and preventing said second rods from moving in the first longitudinal direction.

8. An apparatus for forming a contoured article as claimed in claim 7 wherein said second means includes a motor attached to said base and a shaft attached to said drive plate and said motor whereby when said motor is activated, said shaft and said drive plate move in the first longitudinal direction.

9. An apparatus for forming a contoured article as claimed in claim 1 wherein said plurality of second rods extend in the first longitudinal direction, and said second means further comprises moving means for moving said first end of said second rods and said deformable member in the first longitudinal direction.

10. An apparatus for forming a contoured article as claimed in claim 9 wherein said first means further comprises a frame having a base and a rod guide plate attached to said base, said rod guide plate having a plurality of rod guide holes, each rod guide hole slidably receiving a respective one of said first rods, and a plurality of springs attached to said first rods and adapted to coact with said plate and urge said first rods in a first direction.

11. An apparatus for forming a contoured article as claimed in claim 10 wherein each of first rod first ends has a slot and a deformable member including a plurality of deformable strands received by the slots.

12. An apparatus for forming a contoured article as claimed in claim 11 wherein said locking means comprises a mechanical locking member comprising a fixed plate having a plurality of second holes, wherein each of said second holes receives a respective second rod and a moving plate having a plurality of third holes, whereby each of said third holes receives a respective second rod and means for moving said moving plate in a second longitudinal direction so as to bind said second rods and prevent said second rods from moving in the first longitudinal direction.

13. An apparatus for forming a contoured article as claimed in claim 12 wherein said mechanical locking member includes a cam pivotally attached to said moving plate and said frame includes a leg attached to said base, said rod guide plate and said fixed plate, and said cam is adapted to abut against said leg member in a first position thereby binding said second rods and preventing said second rods from moving in the first longitudinal direction.

14. An apparatus for forming a contoured article as claimed in claim 13 wherein said first rods extend in the first longitudinal direction, each of said first rods having a first end and said first means further comprises moving means for moving said first end of said first rods in the first longitudinal direction, said plurality of first rods adapted to coact with and move against respective ones of said second rods along the first longitudinal direction.

15. An apparatus for forming a contoured article as claimed in claim 14 wherein said second means further comprises a second means frame having a second means base and a second means rod guide plate attached to said second means base, said second means rod guide plate having a plurality of second means rod guide holes, each second means rod guide hole slidably receiving a respective second rod.

16. An apparatus for forming a contoured article of claim 15 wherein each of said second rods includes a second end and second means moving means including a second means drive plate having an upper surface, said second means drive plate adapted to move in the first longitudinal direction, said second means rod second ends adapted to contact said second means drive plate upper surface.

17. An apparatus for forming a contoured article as claimed in claim 16 wherein each of said second rods is made of a magnetic material and said locking means includes a plurality of magnetic members, each magnetic member being adapted to be positioned in close proximity to a respective one of said second rods whereby each of said magnetic member is adapted to be activated to magnetically attract said respective second rod and preventing said second rod from moving in the first longitudinal direction.

18. An apparatus for forming a contoured article as claimed in claim 17 further comprising a first means mechanical locking member comprising a fixed plate having a plurality of second holes, wherein each of said second holes receives a respective first rod and a moving plate having a plurality of third holes, whereby each of said third holes receives a respective first rod and means for moving said moving plate in a second longitudinal direction so as to bind the first rods and prevent said first rods from moving in a first longitudinal direction.

19. An apparatus for forming a contoured article as claimed in claim 1 further comprising: means for obtaining data for the positive surface profile.

20. An apparatus for forming a contoured article as claimed in claim 1 wherein said article is a seat cushion and said apparatus further comprising:

means for forming a seat cushion from the negative surface profile, said means including means for forming said cushion out of a foam material.

21. An apparatus for forming a contoured article as claimed in claim 5 further comprising a computer and means for determining the height of said second rods first end relative to said drive plate, whereby said computer activating each of said magnetic members when said respective first rod first end is at a specific position.

22. An apparatus for forming a contoured article, comprising:

first means for forming a positive surface profile of a contoured surface from data for defining the positive surface profile; and second means for forming a negative surface profile of the contoured surface, said first means adapted to be maintained in contact with said second means, wherein said first means comprises a plurality of rods made of a magnetic material extending in a first longitudinal direction, each of said rods having a first end and a second end, a frame having a base and a rod guide plate attached to said base, said rod guide plate having a plurality of rod guide holes, each rod guide hole slidably receiving a respective rod, means for moving said first ends of said rods in a first longitudinal direction having a drive plate with an upper surface, said drive plate adapted to move in the first longitudinal direction, said rod second ends adapted to contact on said drive plate upper surface, and locking means for locking each of said rods in place having a plurality of magnetic members, each magnetic member being adapted to be positioned in close proximity to one of said respective rods whereby each of said magnetic members is adapted to be activated to magnetically attract said respective rod and prevent said rod from moving in the longitudinal direction.

23. An apparatus for forming a contoured article as claimed in claim 22 wherein said locking means further comprises a mechanical locking member comprising a fixed plate having a plurality of second holes, wherein each of said second holes receives a respective rod and a moving plate having a plurality of third holes, whereby each of said third holes receives a respective rod and means for moving said moving plate in a second longitudinal direction so as to bind said rods and prevent said rods from moving in the first longitudinal direction.

24. An apparatus for forming a contoured article as claimed in claim 23 wherein said mechanical locking member includes a cam pivotally attached to said moving plate and said first means frame includes a leg member attached to said base, said rod guide plate and said fixed plate, and said cam is adapted to abut against said leg member in a first position thereby binding said rods and preventing said rods from moving in the first longitudinal direction.

25. An apparatus for forming a contoured article as claimed in claim 24 wherein said first means includes a motor attached to said base and a shaft attached to said drive plate and said motor whereby when said motor is activated, said shaft and said drive plate move in the first longitudinal direction.

26. An apparatus for forming a contoured article as claimed in claim 22 further comprising a computer and means for determining the height of said rods first end relative to said drive plate, whereby said computer activating each of said magnetic members when said rod end is at a specific position.

27. An apparatus for forming a contoured article, comprising:
    first means for forming a positive surface profile of a contoured surface from data for defining the positive surface; and
    second means for forming a negative surface profile of the contoured surface, said first means adapted to be maintained in contact with said second means,
    wherein said second means comprises a plurality of rods extending in a first longitudinal direction, each of said rods having a slotted first end, a frame having a base, a rod guide plate attached to said base and a leg attached to said base, said rod guide plate having a plurality of rod guide holes, each rod guide hole slidably receiving a respective one of said rods, and a plurality of springs attached to said rods and adapted to coact with said rod guide plate and urge said rods in a first position, locking means for locking each of said rods in place including a mechanical locking member having a fixed plate having a plurality of second holes, wherein each of said second holes receives a respective rod and a moving plate having a plurality of third holes, whereby each of said third holes receives a respective rod, means for moving said moving plate in a second longitudinal direction so as to bind said rods and prevent said rods from moving in the first longitudinal direction, said leg attached to said rod guide plate and said fixed plate, said cam adapted to abut against said leg in a first position thereby binding said rods and preventing said rods from moving in the first longitudinal direction, a deformable member in contact with said rod first ends, said deformable member includes a plurality of deformable strands received by said slots, a spool attached to said frame, said spool adapted to receive said strands, and moving means for moving said first ends of said rods and said deformable member in the first longitudinal direction.

28. An apparatus for forming a contoured article as claimed in claim 27 wherein said first means comprises a plurality of first means rods extending in the first longitudinal direction, each of said first means rods having a first end and having means for moving said first end of said rods in the first longitudinal direction, said plurality of first means rods adapted to coact and move respective ones of said rods of said second means along the first longitudinal axis.

29. An apparatus for forming a contoured article as claimed in claim 28 wherein said first means further comprises a first means frame having a first means base and a first means rod guide plate attached to said first means base, said first means rod guide plate having a plurality of first means rod guide holes, each first means rod guide hole slidably receiving a respective first means rod.

30. An apparatus for forming a contoured article as claimed in claim 29 wherein each of said first means rods includes a second end and said first means moving means includes a first means drive plate having an upper surface, said first means drive plate adapted to move in the first longitudinal direction, said first means rod second ends adapted to contact said first means plate upper surface.

31. An apparatus for forming a contoured article as claimed in claim 30 wherein said first means further comprises first means locking means for locking each of first means said rods in place.

32. An apparatus for forming a contoured article as claimed in claim 31 wherein each of said first means rods is made of a magnetic material and said first locking means includes a plurality of first means magnetic members, each first means magnetic member is adapted to be positioned in close proximity to a respective one of said first means rod whereby each of said first means magnetic member is adapted to be activated to magnetically attract said respective first means rod and preventing said rod from moving in the longitudinal direction.

33. An apparatus for forming a contoured article as claimed in claim 32 wherein said first means locking means further comprises a first means mechanical locking member comprising a first means fixed plate having a plurality of first means second holes, wherein each of said first means second holes receives a respective first means rod and a first means moving plate having a plurality of first means third holes, whereby each of said first means third holes receives a respective first means rod and means for moving said first means moving plate in a second longitudinal direction so as to bind said rods and prevent said rods from moving in a first longitudinal direction.

34. An apparatus for forming a positive surface profile used in forming a contoured article and used in combination with an apparatus for forming a negative surface profile of the contoured surface, which is to be maintained in contact with the apparatus for forming a positive profile, the positive surface profile forming apparatus comprising:
    a frame having a base;
    a plurality of rods made of magnetic material extending in a first longitudinal direction, each of said rods having a first end and a second end;
    a rod guide plate attached to said base, said rod guide plate having a plurality of rod guide holes, each rod guide hole slidably receiving a respective rod;
    a drive plate having an upper surface, said drive plate adapted to move in the first longitudinal direction, said rod second ends adapted to contact on said plate upper surface; and
    a plurality of magnetic members, each magnetic member being adapted to be positioned in close proximity to one of said respective rods whereby each of said magnetic members is adapted to be activated to magnetically attract said respective rod and prevent said rod from moving in the longitudinal direction.

35. An apparatus for forming a negative surface profile used in forming a contoured article and used in combination with an apparatus for forming a positive surface profile of the contoured surface, which is to be maintained in contact with the apparatus for forming the negative profile, comprising:

- a plurality of rods extending in a longitudinal direction, each of said rods having a first end;
- a frame having a base, a leg attached to said base, and a rod guide plate attached to said base, said rod guide plate having a plurality of rod guide holes, each rod guide hole slideably receiving a respective one of said rods;
- a plurality of springs attached to said rods and adapted to coact with said plate and urge said rods in a first position;
- a deformable member in contact with said first ends of said rods;
- a mechanical locking member including a fixed plate having a plurality of second holes, wherein each of said second holes receives a respective rod, and a moving plate having a plurality of third holes, whereby each of the third holes receives a respective rod; and
- a cam pivotally attached to said moving plate, wherein said cam is adapted to abut against said leg in a first position thereby binding said rods and preventing said rods from moving in the first longitudinal direction.

36. An apparatus for forming a contoured article, comprising:

first means for forming a positive surface profile of a contoured surface from data for defining the positive surface profile, which comprises a plurality of first rods made of magnetic material and a plurality of magnetic members, each magnetic member being adapted to be positioned in close proximity to a respective one of said first rods whereby each magnetic member is adapted to be activated to magnetically attract said respective first rod and prevent said first rod from moving in a longitudinal direction; and second means for forming a negative profile of the contoured surface, said first means adapted to be maintained in contact with said second means.

37. An apparatus for forming a contoured article, comprising:

first means for forming a positive surface profile of a contoured surface from data for defining the positive surface profile; and second means for forming a negative surface profile of the contoured surface, said first means adapted to be maintained in contact with said second means, said second means including a plurality of rods extending in a first longitudinal direction, each of said rods having a first end defining a slot, a deformable member in contact with said first ends of said rods, said deformable member comprising a plurality of deformable strands received by said slots, and moving means for moving said first end of said second rods and said deformable strands in the first longitudinal direction.

* * * * *